United States Patent
Ichikawa et al.

(10) Patent No.: US 6,539,935 B2
(45) Date of Patent: Apr. 1, 2003

(54) PACKAGE FOR WARMING FOOD

(75) Inventors: Toru Ichikawa, Misato (JP); Keiichi Toyoda, Soka (JP); Masahiro Ito, Tokyo-To (JP); Satoru Kimura, Ota (JP); Yutaka Okamoto, Tokyo-To (JP)

(73) Assignee: Kabushiki Kaisha Hosokawa Yoko, Tokyo (JP)

( * ) Notice: Subject to any disclaimer, the term of this patent is extended or adjusted under 35 U.S.C. 154(b) by 45 days.

(21) Appl. No.: 09/776,890

(22) Filed: Feb. 6, 2001

(65) Prior Publication Data

US 2002/0104527 A1 Aug. 8, 2002

(51) Int. Cl.$^7$ .............................................. A47J 36/28
(52) U.S. Cl. ................... 126/263.09; 206/222
(58) Field of Search .......... 126/263.01, 263.05–263.09; 206/222

(56) References Cited

U.S. PATENT DOCUMENTS

| 3,392,826 A | * | 7/1968 | Powlan ........................ 206/222 |
| 4,762,113 A | * | 8/1988 | Hamasaki ............... 126/263.09 |
| 5,220,909 A | * | 6/1993 | Pickard et al. ......... 126/263.08 |

FOREIGN PATENT DOCUMENTS

| JP | 1-265920 A | * | 10/1989 |
| JP | 1-274720 A | * | 11/1989 |

* cited by examiner

Primary Examiner—Sara Clarke
(74) Attorney, Agent, or Firm—Birch, Stewart, Kolasch & Stewart, LLP

(57) ABSTRACT

A package enables even aged people and children to warm up foods packaged therein by simply inverting a tank and tearing a sealing member sealing the tank. The package (1) includes an outer vessel (2) having a bottom wall (6b) and projections (7) projecting upward from the bottom wall (6b), an inner vessel (3) placed in the outer vessel (2) so as to form a heat generating block containing space (11) and a tank containing space (12) together with the outer vessel (2), a heat generating block (14) contained in the heat generating block containing space (11), and a tank (4) sealed by a sealing member (18), containing a heat generation promoting agent, having recesses (16) in which the projections (7) engage and placed in the tank containing space (12). The heat generation promoting agent is able to move and come into contact with the heat generating block (14) when the sealing member (18) is broken by separating the tank (4) from the projections (7), inverting the tank (4) and pressing the sealing member (18) against the projections (7).

9 Claims, 2 Drawing Sheets

PACKAGE FOR WARMING FOOD

BACKGROUND OF THE INVENTION

1. Field of the Invention

The present invention relates to a package capable of easily warming food contained therein without using fire.

2. Description of the Related Art

Generally, food is heated in a pan for cooking by heat generated by burning a pocket fuel, such as a solid fuel, when eating the same at a camp.

Some apartment houses for aged people prohibit the use of fire in the apartments to prevent fires. Some people desire to warm up box lunches when taking lunches in vehicles during trips.

Techniques of easily warming food without using fire have been developed. A known technique combines a heating means employing quicklime with a package for containing an alcoholic drink, such as sake, or a lunch to warm up the alcoholic drink or the lunch before taking the same.

The heating means combined with the package for containing an alcoholic drink or a lunch includes a water bag for containing water as a heat generation promoting agent, disposed near quicklime. The water bag is torn with a pin or a string to make the water contained in the water bag and quicklime interact for an exothermic reaction. However, children and aged people have difficulty in using the pin or the string to tear the water bag, and force of a magnitude exceeding a certain level must be used to tear the water back. This known package for containing the alcoholic drink or the lunch is based on a limited technique of heating a specific matter and is incapable of warming up matters other than the specific matter, such as water and retort pouch food (curry).

SUMMARY OF THE INVENTION

The present invention has been made in view of the aforesaid problems and it is therefore an object of the present invention to provide a package provided with a tank sealed by a sealing member and a projection that tears the sealing member sealing the tank to warm up food contained therein, and capable of being easily handled by aged people and children.

A package according to the present invention comprises: an outer vessel having a bottom wall and projections projecting upward from the bottom wall; an inner vessel placed in the outer vessel and having a bottom wall defining a heat generating block containing space together with the bottom wall of the outer vessel and defining a tank containing space above the projections; a heat generating block placed in the heat generating block containing space; and a tank sealed by a sealing member, containing a heat generation promoting agent, having recesses in which the projections of the outer vessel engage and placed in the tank containing space; wherein the heat generation promoting agent is able to move and come into contact with the heat generating block when the sealing member is broken by separating the tank from the projections, inverting the tank and pressing sealing member of the tank against the projections.

Preferably, the projections are tapered upward.

Preferably, each of the projections has a sharp point.

Preferably, the projections engage in the recesses of the tank, respectively, so as to restrain the tank from lateral movement.

Preferably, the heat generating block containing space is formed so that the heat generating block is extended along the outer surface of the bottom wall of the inner vessel.

Preferably, the heat generating block is a solid body formed by shaping and hardening a mixture of magnesium powder and a binder.

Preferably, the heat generation promoting agent is water or salt water.

Preferably, an open end of the outer vessel is covered with a lid.

Preferably, the inner vessel is capable of containing foods for lunch.

Preferably, the inner vessel is capable of containing a liquid, such as water or tea.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
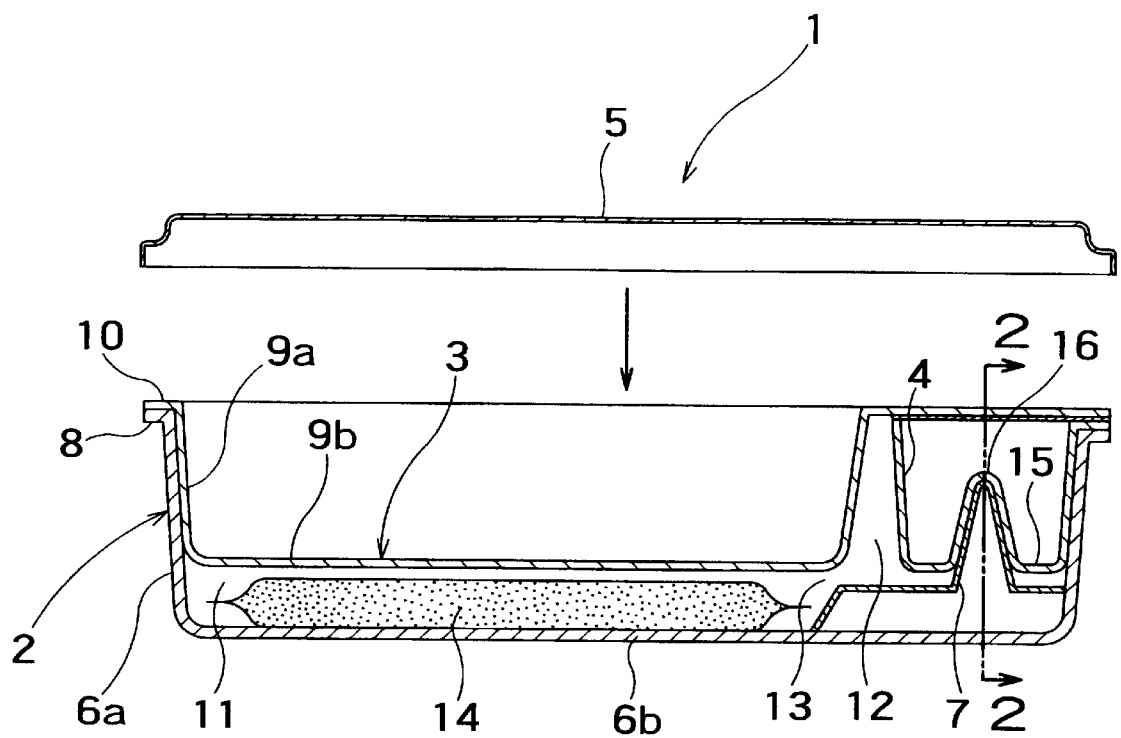
FIG. 1 is a longitudinal sectional view of a package in a preferred embodiment according to the present invention.
Figure 2:
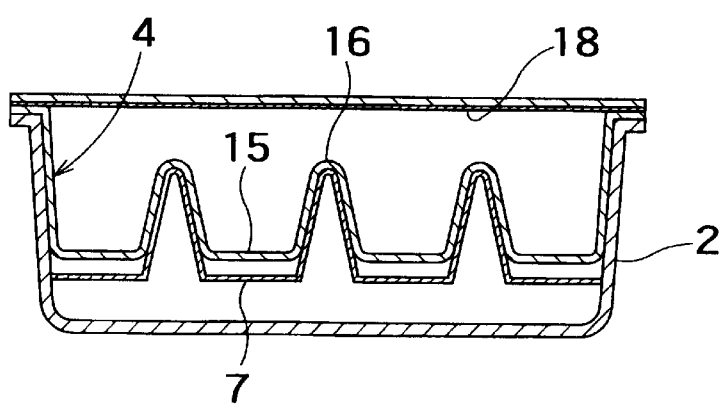
FIG. 2 is a sectional view taken on line 2—2 in FIG. 1.

Referring to FIG. 1, a package 1 in a preferred embodiment according to the present invention includes an outer vessel 2, an inner vessel 3 and a tank 4. The inner vessel 3 and the tank 4 are placed in the outer vessel 2. The open upper end of the outer vessel 2 is covered with a lid 5.

As shown in FIG. 1, the outer vessel 2 has side walls 6a and a bottom wall 6b. The side walls 6a and the bottom wall 6b define a space large enough to receive the inner vessel 3 and the tank 4. Projections 7 are formed in one end part of the bottom wall 6b. Each projection 7 has an edge joined to the bottom wall 6b and an edge joined to the side wall 6a, extends vertically upward and has a sharp point. A flange 8 is formed along the upper edges of the side walls 6a of the outer vessel 2.

The inner vessel 3 has side walls 9a of shorter than the side walls 6a of the outer vessel 2, and a bottom wall 9b. A flange 10 is formed along the upper end edges of the side walls 9a.

When the inner vessel 3 is placed in the outer vessel with its flange 10 resting on the flange 8 of the outer vessel 2, a heat generating block containing space 11 is formed between the bottom wall 9b of the inner vessel 3 and the bottom wall 6b of the outer vessel 2, and a tank containing space 12 is formed between one of the side walls 9a of the inner vessel 3 and the side wall 6a of the outer vessel 2 corresponding to the side wall 9a. A passage 13 is formed between the bottom wall 9b of the inner vessel 3 and base parts 7a of the projections 7 of the outer vessel 2. The heat generating block containing space 11 communicates with the tank containing space 12 by means of the passage 13. A heat generating block 14 is placed in the heat generating block containing space 11 and the tank 4 is placed in the tank containing space 12.

For example, the heat generating block 14 is a solid body formed by shaping and hardening a mixture of magnesium powder and a binder in a shape conforming to the heat generating block containing space 11. A plate containing 30 g of magnesium powder generates heat of 50,4000 calories when about 75 ml of water is poured thereon. A plate containing 25 g of magnesium powder generates heat of 34,020 calories when about 50 ml of water is poured thereon. It was found through experiments that a plate containing 30 g of magnesium powder is capable of heating 227 ml of water of 20° C. to about 80° C. in 10 min.

Figure 3:
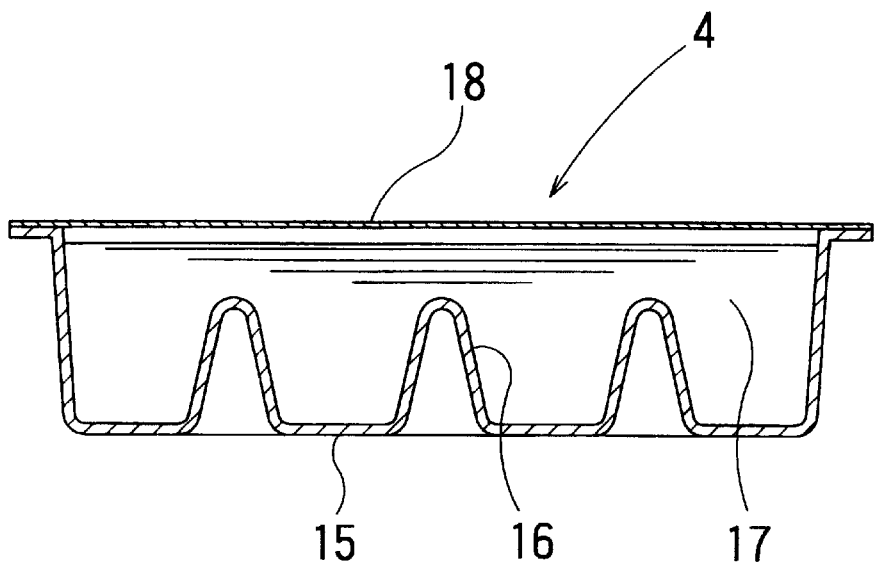
FIG. 3 is a sectional view of a tank for the package according to the present invention.
Figure 4:
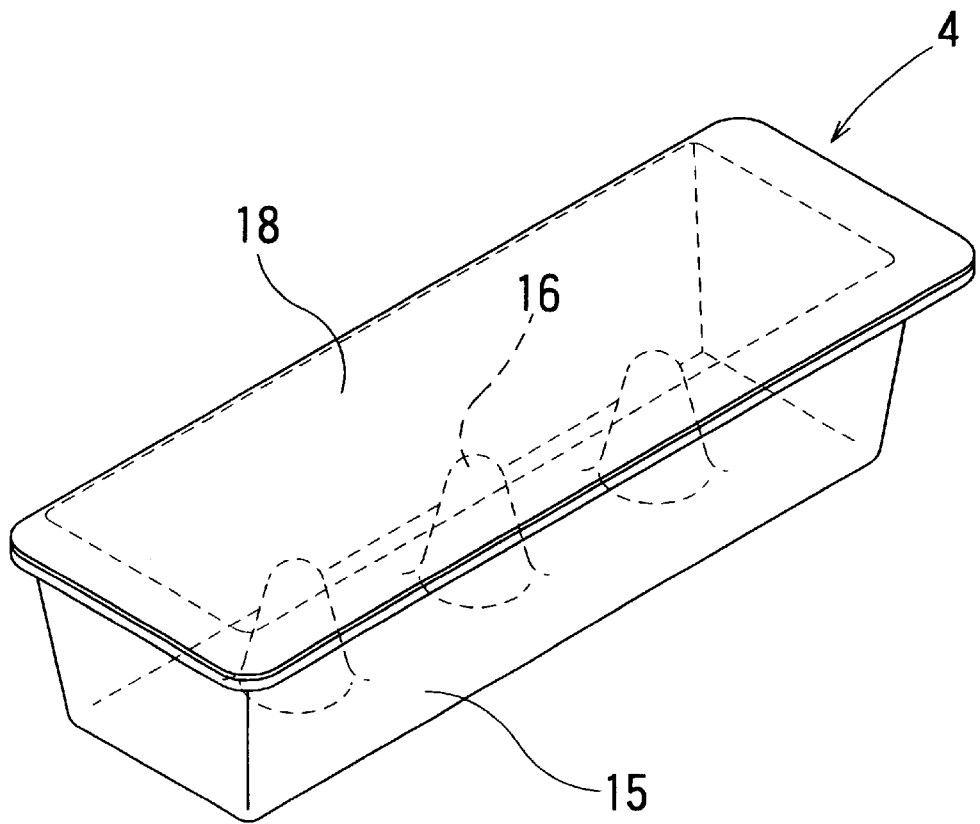
FIG. 4 is a perspective view of the tank shown in FIG. 3.

As shown in FIGS. 3 and 4, the tank 4 has a bottom wall 15 provided with recesses 16 in which the projections 7 can be fitted. The tank 4 contains an amount of a liquid 17, such as water or salt water of 2% salt concentration, sufficient to make the heat generating block 14 react completely with the liquid 17 for endothermic reaction. An upper end of the tank 4 is sealed by a sealing member 18 attached to the tank 4 by heat-sealing. A suitable material for forming the sealing member 18 is a laminate film formed by laminating an aluminum foil, a polyethylene film and a hot-melt adhesive film in that order.

When assembling the package 1, the outer vessel 2, the inner vessel 3, the tank 4, the lid 5 and the heat generating block 14 are prepared. A predetermined amount of the liquid 17 as a heat generation promoting agent, such as water or salt water of 2% salt concentration, is filled in the tank 4 and the sealing member 18 is attached to the tank 4 so as to seal the liquid 17 in the tank 4. The heat generating block 14 prepared by shaping and hardening a mixture of magnesium powder and a binder is placed on the bottom wall 6b of the outer vessel 2 in a region corresponding to the heat generating block containing space 11, the tank 4 containing the liquid 17, i.e., water or salt water of 2% salt concentration, is placed in the outer vessel 2 with the projections 7 of the outer vessel 2 fitted in the recesses 16 of the tank 4, and the inner vessel 3 is placed in the outer vessel 2 with the flange 10 thereof resting on the flange 8 of the outer vessel 2. Preferably, the flange 8 of the outer vessel 2 and the flange 10 of the inner vessel 3 are partly welded together by ultrasonic sealing. Then, the lid 5 is attached to the open end of the outer vessel 2. The outer vessel 2 may be wrapped up in a shrinkable film without using the lid 5. Thus, the package 1 is assembled completely.

A method of boiling water by the package 1 will be described hereinafter. First, the lid 5 covering the open end of the outer vessel 2 of the package 1 is removed and a necessary amount of water is poured in the inner vessel 3. Then the tank 4 is taken out of the outer vessel 2, is inverted and is set in the outer vessel 2 with the sealing member 18 resting on the tips of the projections 7. The tank 4 is depressed to tear the sealing member 18 sealing the tank 4 with the sharp tips of the projections 7. Consequently, the liquid 17, i.e., water or salt water of 2% salt concentration, spills from the tank 4. The spilled liquid 17, i.e., water or salt water, flows from the tank containing space 12 through the passage 13 into the heat generating block containing space 11. The liquid 17, i.e., water of salt water of 2% salt concentration, reacts on the heat generating substance of the heat generating block 14 to make the heat generating block 14 generate heat. The water contained in the inner vessel 3 is heated by the heat generated by the heat generating block 14 to produce hot water of a proper temperature.

A method of warming up foods packaged in the package 1 will be described. The foods, such as cooked rice and cooked foods, are packed in the inner vessel 3. When packing the inner vessel 3 with the foods, the lid 5 of the assembled package 1 is removed from the outer vessel 2, the foods, such as cooked rice and cooked foods, are packed in the inner vessel 3 and the lid 5 is put on the open end of the outer vessel 2.

When heating the foods packaged in the package 1, the lid 5 is removed from the outer vessel 2, the tank 4 containing the liquid 17 is taken out of the outer vessel 2, the tank 4 is inverted and is set in the outer vessel 2 with the sealing member 18 resting on the tips of the projections 7. Then the tank 4 is depressed to tear the sealing member 18 sealing the tank 4 with the sharp tips of the projections 7. Consequently, the liquid 17 spills from the tank 4 flows from the tank containing space 12 through the passage 13 into the heat generating block containing space 11. The liquid 17 reacts on the heat generating substance of the heat generating block 14 to make the heat generating block 14 generate heat. The foods contained in the inner vessel 3 is heated by the heat generated by the heat generating block 14.

The heat generating block included in the package 1 in this embodiment described above is a solid body formed of a mixture of magnesium powder, i.e., a heat generating substance, and a binder. If a heat generating substance other than magnesium powder is employed, a liquid that makes the heat generating substance generate heat is filled in the tank 4.

As apparent from the foregoing description, according to the present invention, foods packaged in the package can be warmed up or water can be boiled simply by taking the tank out of the outer vessel, inverting the tank and tearing the sealing member of the tank with the projections. Thus, the package can be easily handled by aged people and children.

What is claimed is:

1. A package comprising:
   an outer vessel having a bottom wall and projections projecting upward from the bottom wall;
   an inner vessel placed in the outer vessel and having a bottom wall defining a heat generating block containing space together with the bottom wall of the outer vessel and defining a tank containing space above the projections;
   a heat generating block contained in the heat generating block containing space; and
   a tank sealed by a sealing member, containing a heat generation promoting agent, having recesses in which the projections of the outer vessel engage and placed in the tank containing space,
   wherein the heat generating promoting agent is able to move and come into contact with the heat generating block when the sealing member is broken by separating the tank from the projections, inverting the tank and pressing the sealing member of the tank against the projections, and the projections engage in the recesses of the tank, respectively, so as to restrain the tank from lateral movement.

2. The package according to claim 1, wherein the projections are tapered upward.

3. The package according to claim 1, wherein each of the projections has a sharp point.

4. The package according to claim 1, wherein the heat generating block containing space is formed so that the heat generating block is extended along an outer surface of the bottom wall of the inner vessel.

5. The package according to claim 1, wherein the heat generating block is a solid body formed by shaping and hardening a mixture of magnesium powder and a binder.

6. The package according to claim 1, wherein the heat generation promoting agent is water or salt water.

7. The package according to claim 1, wherein an open end of the outer vessel is covered with a lid.

8. The package according to claim 1, wherein the inner vessel is capable of containing foods for lunch.

9. The package according to claim 1, wherein the inner vessel is capable of containing a liquid.

* * * * *